April 24, 1934.   T. J. MERRITT ET AL   1,956,452
GOLF PRACTICING DEVICE
Filed July 8, 1932   2 Sheets-Sheet 1

Inventors
Thomas J. Merritt
George B. Smith
By Clarence A. O'Brien
Attorney

April 24, 1934.  T. J. MERRITT ET AL  1,956,452
GOLF PRACTICING DEVICE
Filed July 8, 1932  2 Sheets-Sheet 2
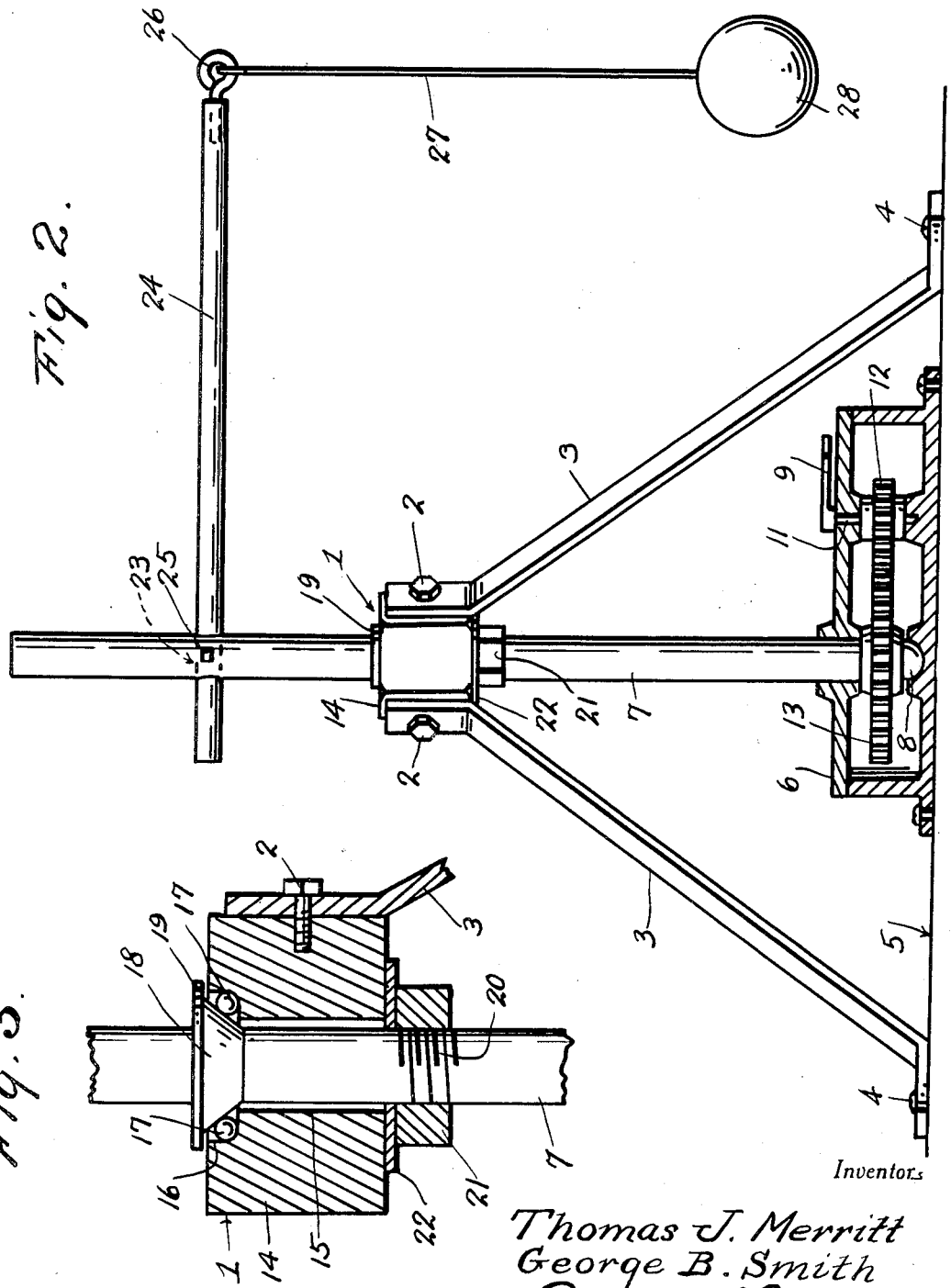
Inventors
Thomas J. Merritt
George B. Smith
By Clarence A. O'Brien
Attorney Patented Apr. 24, 1934

1,956,452

UNITED STATES PATENT OFFICE 1,956,452

GOLF PRACTICING DEVICE

Thomas J. Merritt and George B. Smith, Boston, Mass.; said Smith assignor to said Merritt Application July 8, 1932, Serial No. 621,464

1 Claim. (Cl. 273—35)

The present invention relates to new and useful improvements in golf practicing devices, and has for its primary object to provide, in a manner as hereinafter set forth, a device of this character embodying a novel construction, combination and arrangement of parts through the medium of which the force with which a golf ball is struck and consequently the approximate distance it would travel may be ascertained.

Other objects of the invention are to provide a golf practicing device of the aforementioned character which will be simple in construction, strong, durable, efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a view principally in side elevation and partially in vertical section thereof.

Figure 3 is a detail view in vertical section through the upper bearing, showing the vertical shaft journaled therein.

Figure 1:
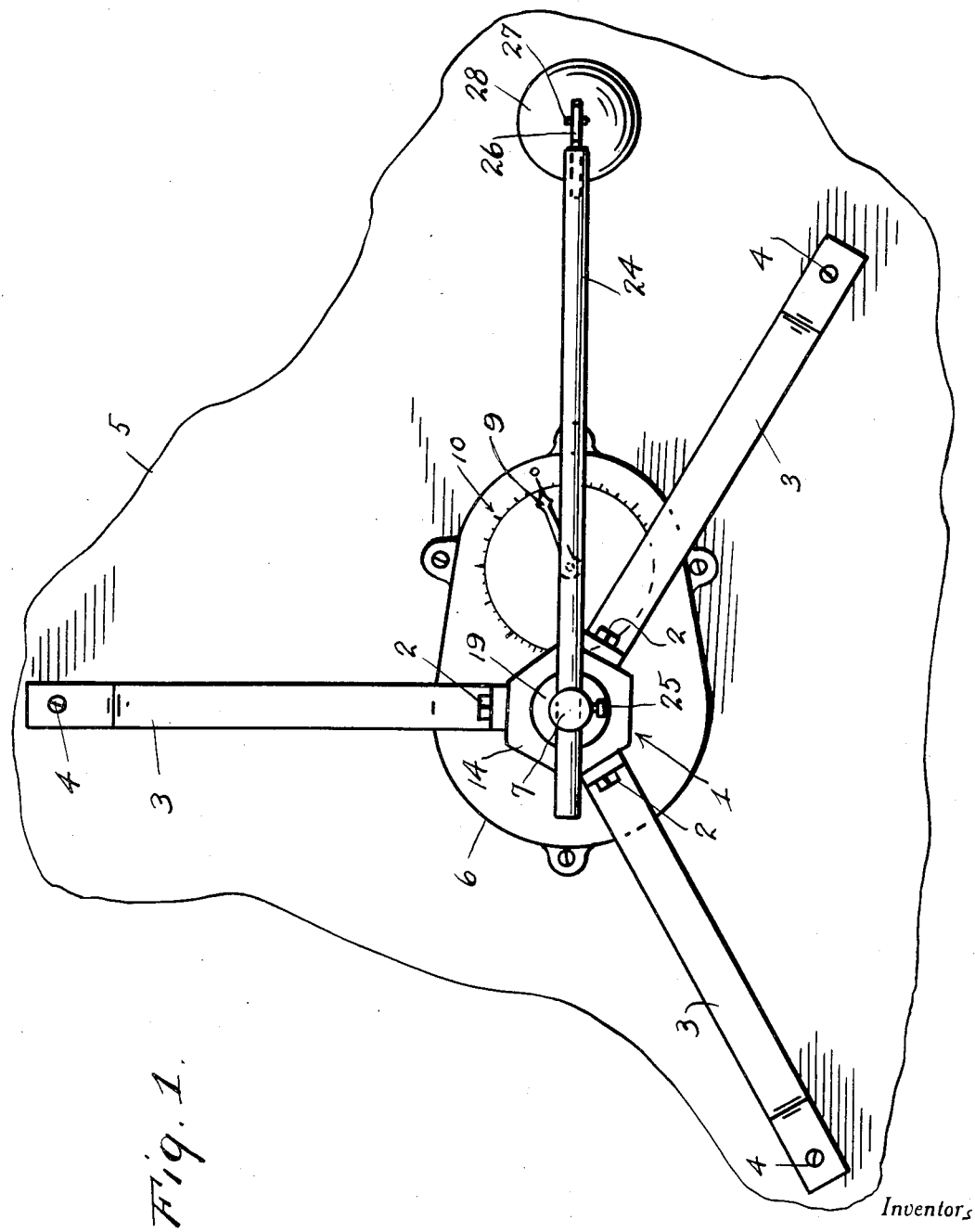
Figure 1 is a view in top plan, showing a golf practicing device constructed in accordance with the present invention.

Referring now to the drawings in detail, it will be seen that the embodiment of the present invention which has been illustrated comprises a vertically arranged bearing which is designated generally by the reference numeral 1, said bearing being secured, as at 2, on the upper end portions of downwardly diverging supporting legs 3 having their lower end portions anchored, as at 4, to a suitable base 5.

Mounted on the base 5 beneath the bearing 1 is a housing 6 in which the lower end portion of a vertical shaft 7 is journaled, said shaft 7 resting on a suitable thrust bearing 8. The reference numeral 9 designates a suitable indicator which rotates above the housing 6 adjacent a dial or graduated circle 10 on top of said housing 6. The indicator 9 is mounted on a vertical shaft 11 which is journaled in the housing 6 and has fixed thereon a gear 12 which is in mesh with a gear 13 fixed on the shaft 7 in the housing 6. Thus, the indicator 9 is connected to the shaft 7 for actuation thereby.

The bearing 1 includes a polygonal body 14 having a bore 15 extending vertically therethrough which accommodates the shaft 7. The upper portion of the bore 15 is counterbored, as at 16 for the reception of thrust balls 17. A cone 18 is provided on the shaft 7 and rests on the balls 17. The reference numeral 19 designates a disk which is integral with the top of the cone 18. The shaft 7 is provided with a threaded portion 20 immediately beneath the bearing 1 on which a nut 21 is threaded. The nut 21 provides means for retaining the cone 18 properly engaged with the bearing balls 17. A washer 22 is mounted on the shaft 7 between the nut 21 and the body 14 of the bearing 1.

An upper portion of the shaft 7 is provided with a diametrically extending opening 23 for the reception of a slidably adjustable horizontal arm 24. The arm 24 is releasably secured in adjusted position through the medium of a set screw 25 which is threaded into the shaft 7 for engagement with said arm 24. The outer end of the arm 24 has mounted thereon an eye 26 to which one end of a string, cord or other flexible strand 27 is connected. On the other end of the strand 27 is secured in any suitable manner a golf ball 28.

In use, the ball 28 is struck with a golf club which causes the shaft 7 to be rotated. The number of revolutions of the shaft 7 may be ascertained by observing the indicator 9 for determining substantially the distance the ball would have traveled if said ball had been free when struck. In other words, each revolution of the shaft 7 is equal substantially to so many linear feet, depending on the adjustment of the arm 24 and the length of the strand 27, that the ball would travel if free.

It is believed that the many advantages of a golf practicing device constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A golf practicing device comprising a polygonal body, downwardly diverging supporting legs rigidly secured to certain of the sides of the body, a vertical shaft journaled in the body, a bearing in the top of the body, a cone on an intermediate portion of the shaft seated on the bearing, a nut threaded on the shaft beneath the body for retaining the cone on the bearing, and a ball connected to the shaft at a point above the body.

THOMAS J. MERRITT.
GEORGE B. SMITH.